United States Patent [19]

Simpson

[11] 4,096,944
[45] Jun. 27, 1978

[54] CARTRIDGE FOR GROUTING AN ANCHOR ELEMENT IN A HOLE OF A SUPPORT STRUCTURE

[75] Inventor: Robert E. Simpson, Spokane, Wash.

[73] Assignee: The United States of America as represented by the Secretary of the Interior, Washington, D.C.

[21] Appl. No.: 853,700

[22] Filed: Nov. 21, 1977

Related U.S. Application Data

[63] Continuation-in-part of Ser. No. 809,883, Jun. 24, 1977, abandoned.

[51] Int. Cl.² .............. B65D 25/08; C04B 11/14; E21D 11/00
[52] U.S. Cl. .................. 206/219; 61/45 B; 106/90; 106/96; 106/105; 106/106; 106/107; 106/111; 106/116
[58] Field of Search ............ 206/219, 568; 260/42.13; 106/96, 116, 111, 90, 105, 106, 107; 61/45 B

[56] References Cited

U.S. PATENT DOCUMENTS

| 1,332,985 | 3/1920 | Jarrett | 206/219 |
|---|---|---|---|
| 3,108,443 | 10/1963 | Schuermann et al. | 61/45 B |
| 3,389,194 | 6/1968 | Somerville | 264/4 |
| 3,873,332 | 3/1975 | McCreight | 106/116 |
| 4,036,301 | 7/1977 | Powers et al. | 106/96 |

FOREIGN PATENT DOCUMENTS

1,443,030  7/1976  United Kingdom ............ 61/45 B

Primary Examiner—Helen M. McCarthy
Attorney, Agent, or Firm—William S. Brown; Donald A. Gardiner

[57] ABSTRACT

A grouting cartridge is described for placing in a hole of a support structure. The cartridge is capable of rapidly forming a solid grout about an anchor element where the anchor element is thrust into the hole. The cartridge comprises a frangible outer tubular casing fabricated of plastic or the like and containing a uniform mixture of a water-hardenable cement and a multitude of frangible microcapsules which hold droplets of water. One or more of these cartridges is placed in the borehole, and the anchor element in a one-step operation is inserted therein, and preferably rotated, to pierce the casing and rupture the microcapsules to uniformly wet the cement to form a cement paste. The cement paste under the pressure of the anchor element flows into intimate contact with the hole wall of the support structure and into intimate contact with the surfaces of the anchor element. The cement paste rapidly solidifies forming a solid grout between the support structure and the anchor element to affix the anchor element securely to the support structure.

6 Claims, 4 Drawing Figures

CARTRIDGE FOR GROUTING AN ANCHOR ELEMENT IN A HOLE OF A SUPPORT STRUCTURE

RELATED APPLICATIONS

This application is a continuation-in-part application of a previously filed application entitled "Anchor Bolt Fixing Method and Water-Cement Package" filed June 24, 1977, Ser. No. 809,883, now abandoned.

FIELD OF THE INVENTION

The present invention relates to the art of installing anchor elements and the like in boreholes and a grouting cartridge for use in such installations.

BACKGROUND OF THE INVENTION

Anchor elements such as rock bolts are common features of mines and the use of hardening resins in securing the anchor elements in boreholes is well-known. Early practice involved the pre-mixing of the various reactive components of the resin, pumping the mixture into the borehole and thereafter inserting the bolt in the borehole. Subsequently, a number of techniques have been developed wherein dual compartment resin packages are used, the compartments of the packages separately storing reactive components of the resin. In use, a package (or packages) is inserted into the borehole and then ruptured by the bolt as the latter is inserted into the borehole and rotated. In this way, the reactive components are mixed in situ to form a solid gel and thereby bond the bolt into position.

Considering exemplary patents in this field, U.S. Pat. Nos. 3,861,522 (Llewellyn al.) al.,) and 3,430,449 (Novotny et al.) disclose anchor bolt packages which comprise a long sausage-like capsule divided into two compartments; one containing resin and the other containing a resin hardening material. U.S. Pat. Nos. 3,737,027 (Ball) and 3,705,646 (Jankowski et al.) disclose composite cartridge packs for a two-component hardening resin used in securing fixing elements in boreholes; the packs comprising two frangible containers one within the other. One of the containers contains resin while the other contains resin hardener. U.S. Pat. No. 3,731,791 (Fourcade et al.) discloses a cartridge for securing fixing elements such as anchor bolts. A resin and a resin setting material are initially placed into direct contact within the capsule and become separated by a thin layer of reaction product. After being placed in the borehole, and upon insertion of a bolt, the resin and catalyst are mechanically mixed and the bolt is set in place. U.S. Pat. No. 3,921,800 (Burns) discloses a capsule used in fixing rock bolts, the capsule containing a "hardener substance" and a phial of "hardenable synthetic resin". In use, the rock bolt, when inserted into a borehole containing the capsule, breaks through a thin main membrane of the capsule and shatters the inner phial, providing mixing or melding of the substances and hence ultimate setting of the bolt. It is noted that the introductory portions of several of these patents discuss further prior art techniques as well as the history of the prior art in general and reference is made to these patents for further description of this area of the prior art.

Although attempts have been made to use a fast-setting cement in fixing anchor elements, these cements form pastes which hydrate so rapidly that the ability of the paste to flow is lost. Exemplary of such attempts is the method described in U.S. Pat. No. 3,108,443 in which the cartridge has an elongated capsule containing water surrounded by an enclosure containing cement. When the water capsule is broken the water has a tendency to flow out the inlet of the hole and not to uniformly mix with the cement. Consequently the cement is not uniformly wetted. Either the cement is too dry or too wet.

SUMMARY OF THE INVENTION

It is the object of this invention to provide a grouting cartridge that is far superior to the previous cartridges and which does not possess such disadvantages. Advantages of the invention will be apparent from the detailed description of a preferred embodiment found hereinbelow.

BRIEF DESCRIPTION OF THE DRAWINGS

A preferred embodiment of this invention is shown in the accompanying drawing, in which.

DESCRIPTION OF THE INVENTION AND THE PREFERRED EMBODIMENT

Figure 1:
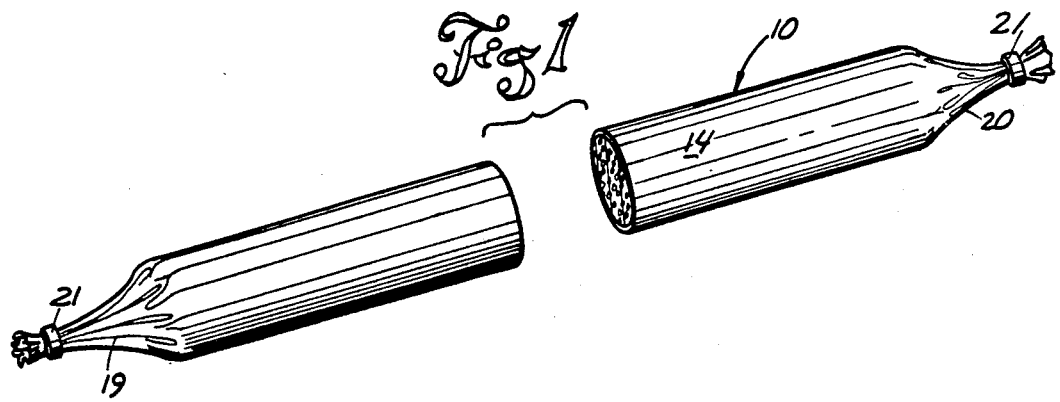
FIG. 1 is an isometric view of the grouting cartridge which is the subject of the present invention.

As described hereinabove, the invention concerns a grouting cartridge 10 for use in fixing an anchor element 11 such as rock bolt or the like in borehole 12. Cartridge 10 is preferably tubular-shaped containing powdered cement 15 and microcapsules 16 of water so packaged to ease handling and placement of quick-set cement mortar into the drilled hole for retaining the anchor element.

Referring to the drawings, the water-cement package or cartridge 10 of the invention is illustrated and, as stated, preferably comprises an elongated outer casing or wrapper in the form of a thin frangible film tube, denoted 14. The casing 14 extends between enclosed ends 19 and 20. Tube 14 contains a heterogeneous mixture of a continuous phase, hydraulically setting dry cement powder indicated by the numeral 15, and a discontinuous phase of a multitude of individual microcapsules 16 uniformly dispersed and suspended in the cement powder continuous phase 15. Crimping sleeves or clamps 21 may be used at both ends 19 and 20 to enclose these ends and maintain the contents substantially air and moisture free.

The microcapsules 16 of water and cement powder 15 are the principal ingredients of the filler for the cartridge. Chemicals for accelerating hardening may be added in amounts generally not exceeding 3 percent of the weight of the cement. The cement must be a type that will harden under water (inundated), and which is technically known as hydraulic cement. Suitable types of hydraulic cement include portland, pozzolan, gypsum plaster, magnesium oxychloride, and magnesium oxysulfate. The cement is generally used neat, or undiluted with sand or other filler, to form a stronger, faster handening material.

The microcapsules 16 are spherical in shape and comprise an outer shell of insoluble frangible material surrounding and containing a small globule or droplet of water. The microcapsules can be made in varying sizes ranging from 400 to 5000 microns in diameter. Preferably the microcapsules have a diameter between 1000 and 1700 microns. When combined with cement, the microcapsules serve to store the water separate from the cement until the microcapsules are broken.

To form a package or cartridge 10, the cement powder 15, microcapsules 16 and accelerating chemical are blended in proper proportion into a heterogeneous dry mixture with the microcapsules 16 uniformly dispersed and suspended in the cement powder 15, which is then encased in tubular wrapper 14 of thin film, closed at each end with a binding or clamp, such as indicated at 21. The length of the cartridge is not fixed, but should not exceed the depth of the hole in which the rod or bolt is to be anchored; nor should the cartridge be so long as to be inconvenient to handle. The cartridge diameter must be sized to permit ready insertion into the pre-drilled hole in rock, concrete, or other substance.

Figure 2:
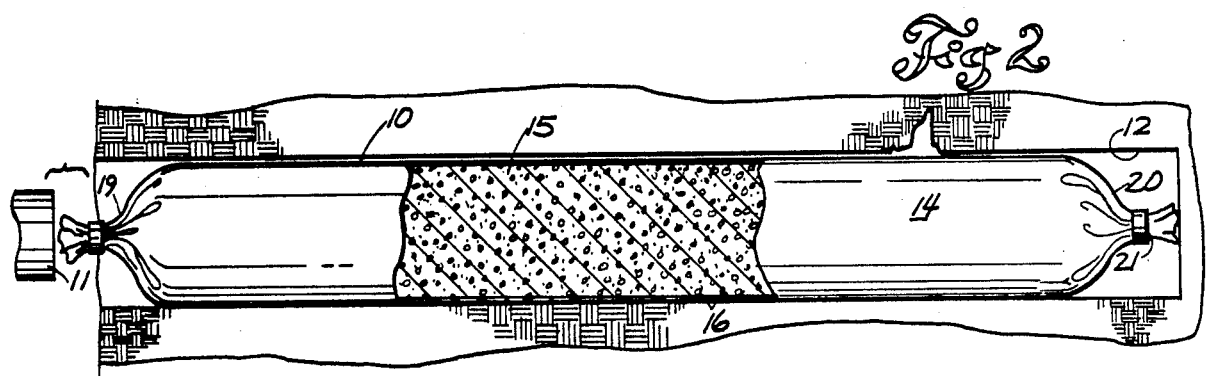
FIG. 2 is a longitudinal sectional view of a borehole showing a cartridge mounted therein.
Figure 3:
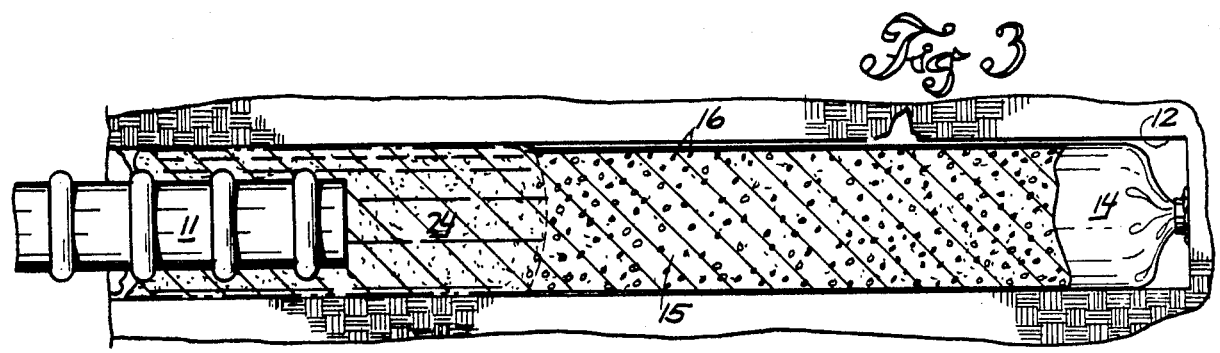
FIG. 3 is a view similar to FIG. 2 except showing an anchor bolt being inserted into the borehole penetrating the cartridge.
Figure 4:
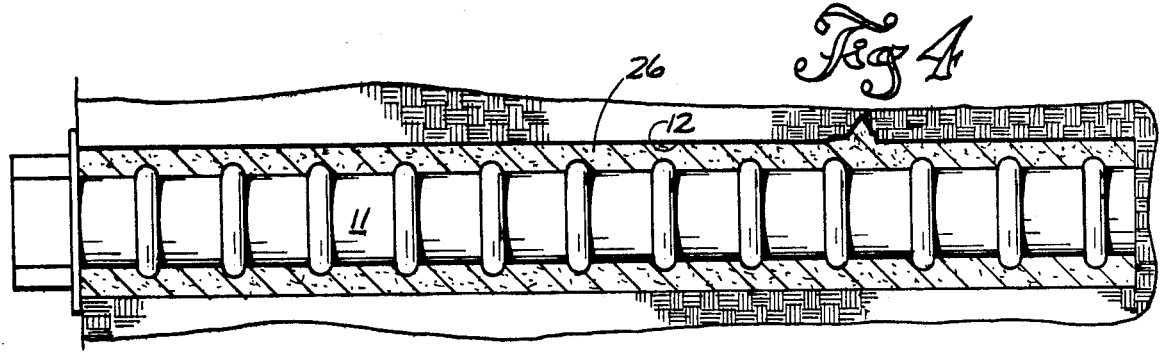
FIG. 4 is a view similar to FIG. 3 except showing the anchor both fully mounted in the borehole with solid grout securing the anchor bolt therein.

As discussed above, before installing the anchor element, one or more cartridges 10 is inserted into the hole. Then an anchor element 11 such as a steel bolt is forcibly inserted into the hole, generally by rotation as illustrated in FIGS. 2-4. The anchor element 11 can be threaded, but usually comprises a deformed concrete reinforcing bar, commonly referred to as a "rebar".

The pressure and rotation of the anchor element during insertion ruptures and penetrates the cartridge, shreds the wrapper or casing, and progressively breaks the microcapsules ahead of the anchor element, thereby uniformly releasing the contained water to form a uniform paste between the ends of the cartridge. The water and cement form a flowable paste 24 which under the pressure of the anchor element fills the annular space between the wall of the hole and anchor element to intimately contact the hole wall and the anchor element. The paste 24 fills voids in the borehole wall structure. Rotation of the anchor element also aids in the agitation and migration of the paste flow. The progressive formation of the paste ahead of the anchor element permits the anchor element to be inserted with a rather uniform pressure.

The ensuing chemical reaction of hydration causes hardening of the paste 24 to form a solid grout 26 to hold the anchor element 11 securely in the borehole 12.

Considering the invention in more detail, the microcapsules 16 of water are preferably formed by surrounding small droplets of water with a fluid shell material which is then hardened after capsule formation. A number of patents have been granted for producing microcapsules of fluids and the microcapsules used in the package of the present invention are made in accordance with the mass-production method disclosed in U.S. Pat. No. 3,389,194. In accordance with this method, a pair of concentric tubes open into a conduit, and water (or a dilute aqueous solution of accelerator) and a wax-like film material in a molten state are fed into the inner and outer tubes, respectively, so as to extrude concentric rods of such material from the ends of the tubes. A stream of carrier fluid is forced through the conduit and about the tube ends at a speed greater than the rate of extrusion so as to cause the rods to elongate and break off into individual segments which form fluid droplets within the film material. The carrier fluid, being of a temperature below the melting temperature of the molten shell material, cools the shell causing it to harden while the microcapsules are suspended in the stream. Generally the water represents about two-thirds and the shell represents about one-third of the total weight of the microcapsules. This relationship varies with the diameter of the microcapsules.

It is necessary that the shells of the microcapsules be sufficiently strong to contain the water without leakage under normal handling and storing conditions. However, the shell of the microcapsule must be sufficiently frangible to be easily ruptured by the application of external pressure engendered by the insertion of the anchor element so as to form a paste formed ahead of the anchor element. The shell should be sufficiently frangible to be crushed between one's fingers. Preferably the shell should be crushable by the application of 10 to 600 grams force as measured by a Hunter Force Gauge, Model L-500M.

The wrapper or casing 14 serves to confine the mixture in a tubular shape and can be of thin plastic film, paper, or similar material. For example, 1½ mil thick (0.0015 inch) polyethylene tubing can be used in making cartridges 0.95 inches in diameter and 12 inches long. Cartridges may be of any length that can be reasonably handled, provided that, as noted previously, they are shorter than the depth of the hole. As discussed, the wrapper tube is crimped, clamped or tied off on one end, filled to the desired length, and then closed off at the other end by crimping, clamping or tying. The cartridge wrapper 14 must be strong enough to contain the mixture and to withstand reasonable handling. On the other hand, the wrapper or casing 14 must be weak, or frangible enough to be punctured and shredded by insertion of the bolt. The diameter of the cartridge must be slightly smaller than the hole to allow clearance for insertion. The actual amount of clearance depends on the minimum diameter of the hole, which, in turn, is often determined by the smoothness or roughness of the hole surface. Cartridge diameters generally should be small enough to be inserted into the hole without difficulty, but large enough to provide some drag or friction, especially in upwardly directed holes, so as to provide self-retention.

For a particular formula, the proportions of cement, microcapsules, and additives are usually determined by laboratory tests using water in place of water capsules. After the formula is determined, the amount by weight of water capsules can be calculated, using the actual water content as provided by the manufacturer's specifications. In the calculation, the shell material is treated as inert filler, similarly to sand in a cement paste when making mortar.

The general operable range is to mix 1 part water with 2.5-4.0 parts by weight of cement powder. This range varies with the type and manufacture of the cement powder. Particularly good results have been achieved by using one part water to three parts alpha gypsum cement powder. It is preferable to use neat cement without substantial filler or inert material. When using microcapsules having diameters between 1000 and 1700 microns, applicant has found that a mixture of about 50-55 grams of microcapsules with each 100 grams of alpha gypsum cement powder has produced good results.

In a specific example, a formula of alpha gypsum cement with 1½ percent potassium sulfate accelerator and 32 percent water added by using water capsules, consisted of the following proportions by weight:

| Component (and calculation) | Grams | Percent |
|---|---|---|
| Alpha gypsum cement | 100.0 | 66.7 |
| Potassium sulfate | 1.5 | 1.0 |
| Water capsules: | | |
| Water 67% Water required | | |
| (32% × 101.5 gms) | 32.5 | 32.3 |
| Shell 33% Inert shell | | |
| (32.5 gms × $\frac{33}{67}$) | 16.0 | |
| | 150.00 | 100.00 |

After the desired proportions of cement, microcapsules, and additives, if any, are determined, the correct quantities are weighed and then blended into a heterogeneous mixture with the microcapsules essentially uniformly dispersed in the cement powder continuous phase. Blending is done in any suitable device that is gentle in action and will not prematurely crush the microcapsules.

Considering an exemplary test installation, twelve inches of a 30-inch long, No. 6 (¾-inch) deformed concrete reinforcing bar (rebar) were anchored into a 1 1/16-inch diameter by 12-inch deep hole in concrete. The following materials and specifications were utilized:

| Cartridge: 0.95 inches in diameter, 11 inches long | | |
|---|---|---|
| Filling material: | | |
| Alpha gypsum cement (U.S. Gypsum Corp., Airtrol H) | 100 gm.s | 66.0% |
| Potassium sulfate | 1.5 gms. | 1.0% |
| Microcapsules: | | |
| Theoretical water: | 64.7% | |
| Size: | 1000-1700 microns (0.039-0.067 inches) | |
| Shell: | 60% Sunoco Wax 4412 25% Piccolyte S-115 15% Elvax 210 50 gms. | 33.0% |
| | | 100.0% |
| Wrapper: 1¼ inch, lay flat tubing of 0.0015-inch (1½ mils) thick polyethylene. Forms a round tube 0.95 inches diameter. | | |
| End crimpers for cartridge: 2 model 410 NAED wire crimp sleeves | | |

The cartridge was placed in a 1 1/16-inch-diameter by 12-inch-deep hole. The upper end of the rebar was machined smooth so that it would fit in a ½-inch Jacobs chuck mounted on a handheld electric drill. Powered by the electric drill motor, the rebar was drilled down through the cartridge to the 12-inch depth in 5 seconds. The motor was removed, and a hollow center hydraulic jack placed over the rebar to rest on the concrete surface. A collet was placed above the jack to grip the rebar. This arrangement allowed the jack to push up on the rebar for pull on the anchored portion. After an elapsed time of 4 minutes from beginning of bolt insertion, the jack was activated until the bolt began pulling from the hole. A pressure gauge, calibrated to show the pull force, read 9,000 pounds at failure.

Although the invention has been described relative to exemplary embodiments thereof, it will be understood that variations and modifications can be effected in these embodiments without departing from the scope and spirit of the invention.

What I claim is:

1. A cartridge for grouting an anchor element in an elongated hole of a support structure, comprising:
   an elongated tubular casing fabricated of a frangible material capable of being punctured and shredded by an anchor element thrust into the cartridge and having a diameter between enclosed ends sufficient to enable the cartridge to be introduced into the hole;
   a heterogeneous mixture of a continuous phase of dry hydraulic cement powder and a discontinuous phase of a multitude of water-containing microcapsules essentially uniformly dispersed in the continuous phase that fills the interior of the tubular casing between the enclosed ends;
   wherein the microcapsules have diameters in a range of 400 to 5000 microns and have inert, frangible shells enclosing droplets of liquid water that are pressure sensitive and are capable of being progressively ruptured by the force of said anchor element being thrust into the cartridge when the cartridge is positioned in the hole to thereby dispense the water substantially uniformly throughout the cement powder to enable the water and cement powder to thoroughly interact to form a flowable cement paste in intimate contact with the hole wall and the anchor element, which when solidified forms a uniform grout about the anchor element to secure the anchor element to the support structure.

2. The grouting cartridge as defined in claim 1 wherein the microcapsules have diameters in a range of 1000 to 1700 microns.

3. The grouting cartridge as defined in claim 1 wherein the mixture is blended having 1 part water to 2.5 – 4.0 parts of cement powder by weight.

4. The grouting cartridge as defined in claim 1 where the mixture is blended having one part water to three parts gypsum cement powder by weight.

5. The grouting cartridge as defined in claim 1 wherein the microcapsule shells are sufficiently frangible to be ruptured en masse upon the application of a pressure of between 10 and 600 grams force.

6. The grouting cartridge as defined in claim 1 wherein the microcapsules contain an aqueous solution of a chemical accelerator for accelerating the hardening of the cement powder when the microcapsules are ruptured.

* * * * *